Jan. 12, 1960     D. U. HUNTER     2,920,858
VALVE ASSEMBLIES
Filed Jan. 31, 1956
FIG. 1.
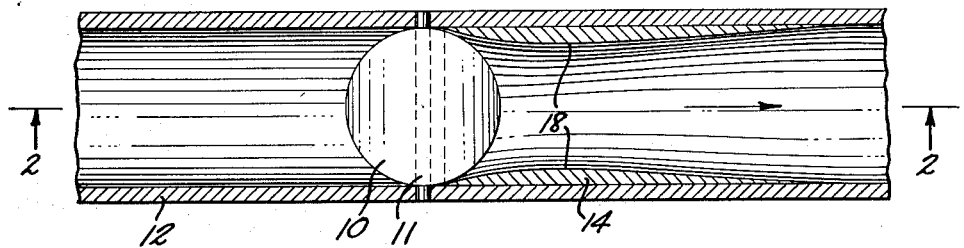
FIG. 2.
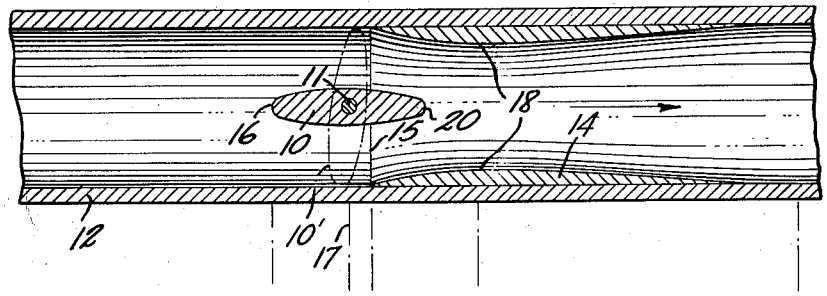
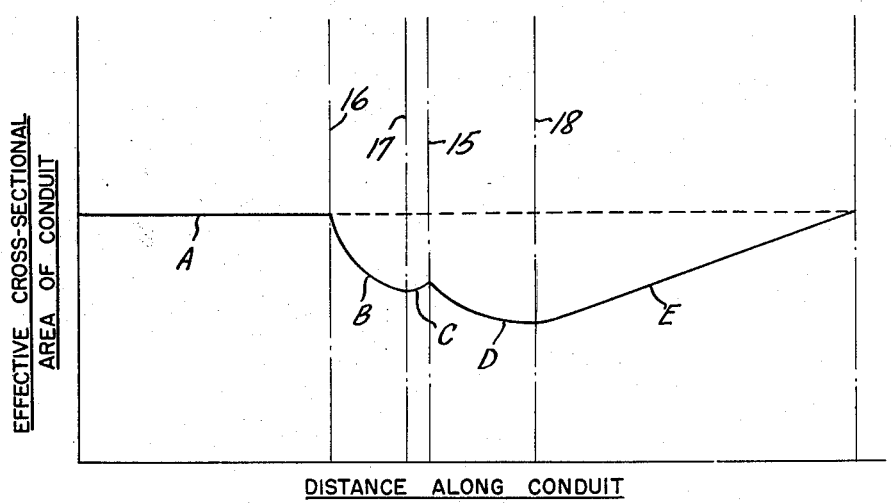
FIG. 3.
*INVENTOR.*
DAVID ULRICH HUNTER
BY
*his ATTORNEYS.*

United States Patent Office 2,920,858
Patented Jan. 12, 1960

2,920,858

VALVE ASSEMBLIES

David Ulrich Hunter, Huntington, N.Y., assignor to Fairchild Engine and Airplane Corporation, Hagerstown, Md., a corporation of Maryland Application January 31, 1956, Serial No. 562,379

2 Claims. (Cl. 251—118)

The present invention relates to valve assemblies, and, more particularly, to loss-reducing means for reducing losses occasioned by the presence of a valve disc in its fully open position in a conduit.

During the flow of fluids through a conduit, a boundary layer is built up in the fluid stream adjacent the walls of the conduit by the effect of the viscous drag exerted on the fluid. This viscous drag results in a loss in velocity head in that portion of the fluid stream adjacent the walls of the conduit. In addition to the boundary layer losses adjacent the walls of the conduit, the introduction of an object such as the valve disc of a butterfly valve into the conduit causes further losses. When a valve disc of the butterfly valve is in a position other than fully open, these additional losses introduced by the valve are intentional. However, when the valve is fully open, the intention is to introduce the least possible loss into the system. Of course, some loss must occur unless the valve disc can be completely removed from the conduit.

Valve discs of various configurations have been developed in order to overcome these losses which are introduced into a system by butterfly valves and like means. In general, an attempt usually has been made to make the valve disc as streamlined as possible. The thickest portion of the valve disc is usually that portion through which the shaft upon which the valve disc rotates passes. The thickness of the valve then diminishes toward both the leading and trailing edges of the disc. When the valve is in its fully open position, the thickness of the valve disc will increase from its furthest up-stream point toward and to the thickest portion of the valve shaft. Assuming that the conduit is of constant cross-sectional area, the effective cross-sectional area of the fluid passage through the conduit will decrease as the thickness of the valve increases. When this occurs, the fluid flow is caused to accelerate. This acceleration prevents any substantial build-up of the boundary layer adjacent the surfaces of the upstream half of the valve disc.

In opposite fashion, the thickness of the trailing portion or down-stream portion of the valve disc diminishes from the center line of the shaft toward the trailing edge. This decrease in thickness of the valve disc causes a corresponding increase in the effective cross-sectional area of the fluid passage through the conduit and fluid flow decelerates. Because of the deceleration of the fluid flow along the trailing surfaces of the valve disc, a substantial build-up of the boundary layer conditions is permitted and is accompanied by substantial velocity head losses in the fluid flow.

In the prior art, the configuration of the valve disc has been modified in a variety of ways to reduce this build-up of the boundary layer caused by the deceleration of the fluid flow on the trailing portion of the valve disc. However, it is apparent that whatever shape is given to the valve disc, it must conform to the internal configuration of the conduit. Therefore, at some point along the trailing portion of the valve disc, there must be a relatively rapid decrease or discontinuity in the thickness of the disc, accompanied by a substantial boundary layer build-up.

While these losses, which are occasioned by the boundary layer build-up on the trailing portions of the valve disc, are relatively insignificant in many systems, it has been found that in some highly sensitive fluid responsive systems they assume substantial relative magnitudes.

In accordance with the invention, this type of loss may be substantially reduced by controlling the effective cross-sectional area of the conduit adjacent the valve disc in such a manner as to provide a very gradual and slow rate of deceleration for the fluids passing the valve disc.

A more complete understanding of the invention may be had by reference to the following detailed description taken in conjunction with the accompanying figures of the drawing, in which:

Figure 1 is a longitudinal cross-sectional view of a conduit showing an exemplary form of throttle valve assembly, in accordance with the principles of the invention;

Fig. 2 is another longitudinal cross-sectional view of the throttle valve assembly in Fig. 1, but at right angles thereto, taken along the lines 2—2 and looking in the direction of the arrows; and Fig. 3 is a graphical representation of the effective cross-sectional area of that portion of the conduit in Fig. 2 including the valve assembly.

Referring to Fig. 1, a throttle valve 10, of the conventional butterfly type, is mounted for rotation about a valve shaft 11 in a conduit 12 having a constant internal, cross-sectional area. As seen in Fig. 2, the up-stream and down-stream portions, or leading and trailing portions, respectively, of the valve disc 10 have a streamlined configuration increasing in thickness from the furthermost up-stream and down-stream edges of the valve disc toward the center line of the valve shaft 11. When the valve disc 10 is in its fully closed position, as shown by the dotted outline 10' in Fig. 2, the plane of the valve is at a conventional angle of approximately 10°–15° to a transverse plane through the center line of the valve shaft normal to the longitudinal axis of the conduit.

On the other hand, when the valve disc 10 is fully open, as shown by the full lines in Figs. 1 and 2, the plane of the valve is aligned with a longitudinally diametrical plane passing through the conduit 12.

A tubular loss-reducing member 14 is positioned in the conduit 12 and extends in a down-stream direction from a point 15 just down-stream of the shaft 11. In the preferred embodiment of the invention, the up-stream edge 15 of the loss-reducing member 14 is positioned as close as possible to the center line of the valve shaft 11, allowing only the necessary clearance for the controlled movement of the valve disc 10.

Since the conduit 12 is of constant internal cross-sectional area, its effective cross-sectional area may be depicted by a straight line A, in Fig. 3. However, from the furthermost up-stream portion 16 of the valve disc 10 to the center line 17 of the valve shaft 11, the effective cross-sectional area of the conduit decreases, as shown by the downwardly curved line B, in Fig. 3. The fluid passing through this portion of the conduit having the decreasing effective cross-sectional area is caused to accelerate, thereby substantially reducing or eliminating the build-up of a boundary layer on the up-stream or leading portion of the valve disc 10.

The effective cross-sectional area of the conduit in the short space from the center line 17 of the valve shaft 11, or a point just down-stream thereof, to the up-stream edge 15 of the loss-reducing member 14 gradually increases, as shown by the line C, in Fig. 3. This increase in the effective cross-sectional area is accompanied by a deceleration of the fluids flowing through the conduit 12 and a corresponding slight build-up of a boundary layer along the surfaces of that portion of the valve disc 10 between the lines 17 and 15.

The inner configuration of the tubular loss-reducing member 14 is such that the effective cross-sectional area of the conduit between the up-stream edge 15 of the loss-reducing member 14 and the point of minimum internal diameter 18 gradually decreases, as shown by the curved line D, even though the thickness of the valve disc 10 gradually decreases toward its trailing edge 20, which is located at a point up-stream of the points 18. Because of this gradual decrease in the effective cross-sectional area of the conduit 12, the fluid flow through this portion of the conduit continues to accelerate, substantially lessening or preventing the build-up of a boundary layer contiguous to the surfaces of both the trailing edge of the valve disc 10 and the up-stream portion of the loss-reducing member 14.

Down-stream of the points 18, the inner diameter of the loss-reducing member 14 gradually increases in a tapered fashion, as shown in Figs. 1 and 2. Correspondingly, the effective cross-sectional area of the conduit 10 from the points 18 gradually increases, as shown by the substantially straight line E, until the effective cross-sectional area has been restored to the original value A.

The angle included by the inner sides of the loss-reducing member 14, as shown in Figs. 1 and 2, is preferably on the order of 6°–10°. It has been found that the rate of deceleration of the fluids in a conduit under these conditions is quite small and that only a very small boundary layer will build up contiguous to the loss-reducing member.

Thus, there has been provided, in accordance with the invention, a novel and improved valve assembly wherein losses occasioned by the presence of the valve disc in the conduit are substantially reduced.

The above disclosed embodiment is meant to be merely exemplary, and it will be obvious to those skilled in the art that it is susceptible of modification and variation without departing from the spirit and scope of the invention. For example, while a valve disc and loss-reducing member have been shown and discussed with regard to the above embodiment, it will be obvious that the valve disc and the loss-reducing member can have a great variety of different configurations. However, the loss-reducing member should be positioned in the conduit with respect to the valve disc in such a way as to decrease or maintain constant the effective cross-sectional area in that portion of the conduit from the axis of the valve shaft to the trailing edge of the valve disc when the valve disc is in its fully open position. Therefore, the invention is not deemed to be limited except as defined in the appended claims.

I claim:
1. A valve assembly for use in a tubular conduit or the like having a constant internal cross-sectional area, comprising a circular valve disc adapted to be mounted in the conduit for rotation about a valve shaft, said valve disc being of progressively increasing thickness from its leading edge to a first point proximate said valve shaft to provide a progressive decrease in the effective cross-sectional area of that portion of the conduit intermediate said leading edge and said first point when said valve disc is in its fully open position, tubular means disposed in said conduit longitudinally down-stream of said valve shaft and extending from a second point intermediate said valve shaft and the farthest down-stream portion of the trailing edge of said valve disc for gradually decreasing the effective cross-sectional area of that portion of said conduit.

2. A valve assembly for use in a tubular conduit or the like having a constant internal cross-sectional area, comprising a circular valve disc adapted to be mounted in the conduit for rotation about a valve shaft, said valve disc being of progressively increasing thickness from its leading edge to a first point proximate said valve shaft to provide a progressive decrease in the effective cross-sectional area of that portion of the conduit intermediate said leading edge and said first point when said valve disc is in its fully open position and being of progressively decreasing thickness from a second point proximate said valve shaft to the down-stream edge of said valve disc when said valve disc is in its fully open position, tubular means disposed in said conduit longitudinally down-stream of said valve shaft, a first portion of said tubular means extending from a point intermediate said valve shaft and the farthest down-stream portion of the trailing edge of said valve disc for gradually decreasing the effective cross-sectional area of that portion of said conduit, and another portion of said tubular means extending in the down-stream direction from the farthest down-stream portion of the trailing edge of said valve disc for gradually increasing the effective cross-sectional area of that portion of the conduit in a down-stream direction.

References Cited in the file of this patent

UNITED STATES PATENTS

| 1,485,658 | Winters | Mar. 4, 1924 |
| 2,355,267 | Boylan | Aug. 8, 1944 |

FOREIGN PATENTS

| 317,991 | Great Britain | May 9, 1929 |
| 141,967 | Switzerland | Nov. 17, 1930 |
| 737,225 | France | Oct. 3, 1932 |